May 8, 1962 W. H. MARSTON ET AL 3,033,585
VEHICLES
Filed Sept. 4, 1959 4 Sheets-Sheet 1
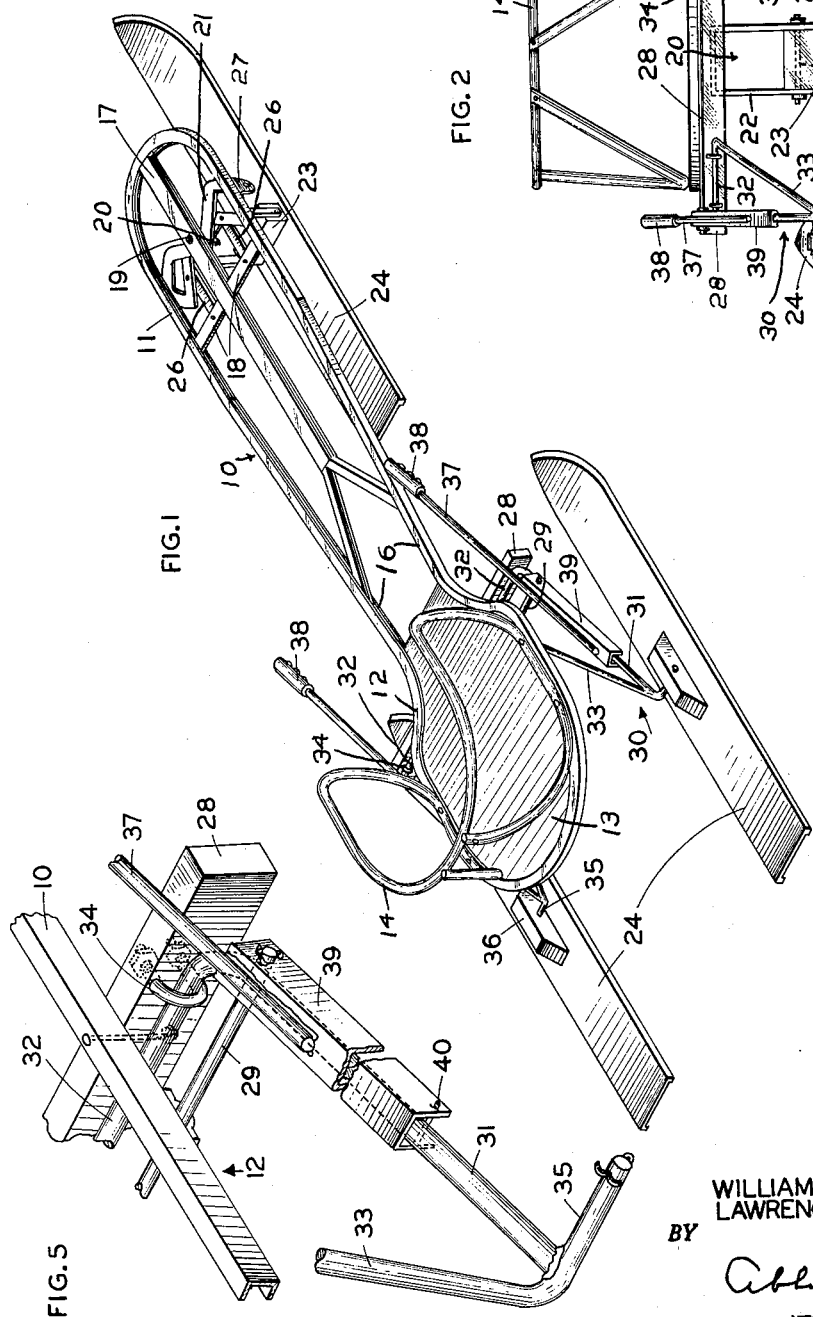
INVENTORS
WILLIAM H. MARSTON
LAWRENCE E. DEARBORN
BY
ATTORNEY May 8, 1962 W. H. MARSTON ET AL 3,033,585
VEHICLES
Filed Sept. 4, 1959 4 Sheets-Sheet 2
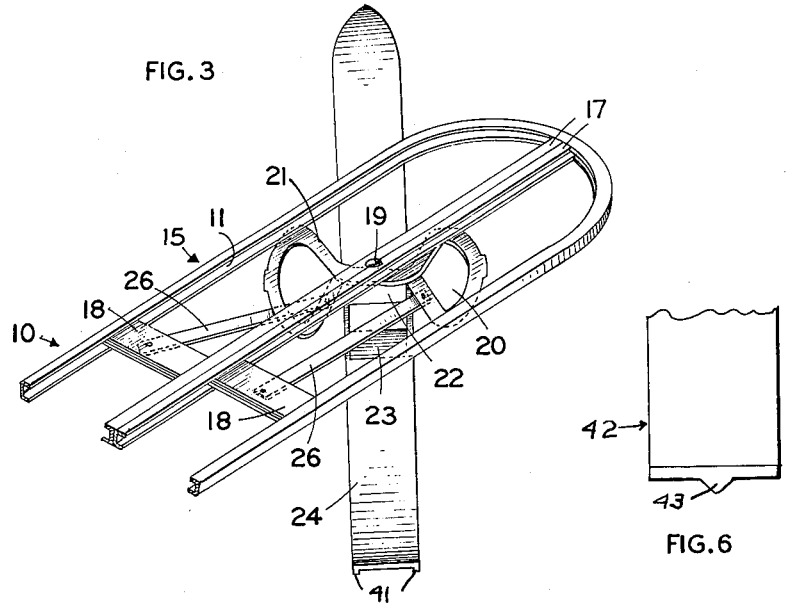
FIG. 3
FIG. 6
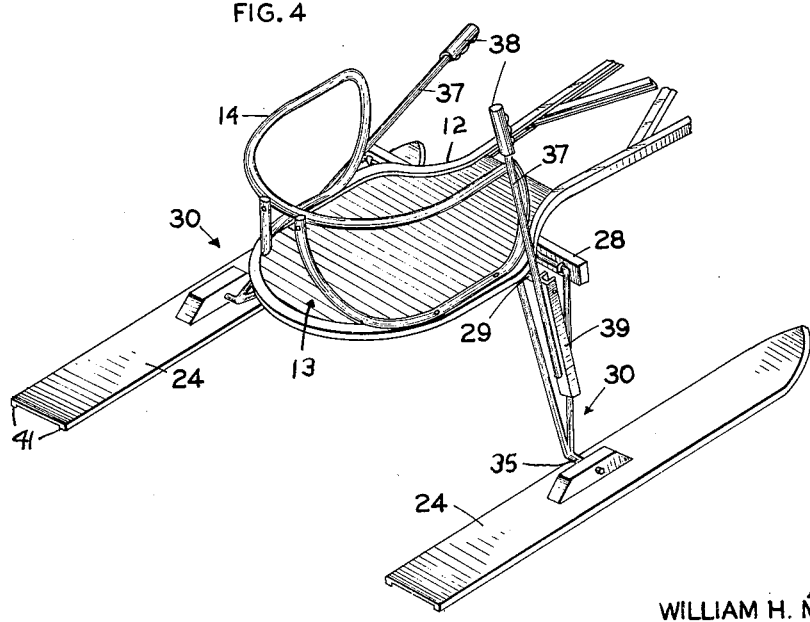
FIG. 4
INVENTORS
WILLIAM H. MARSTON
LAWRENCE E. DEARBORN
BY
ATTORNEY

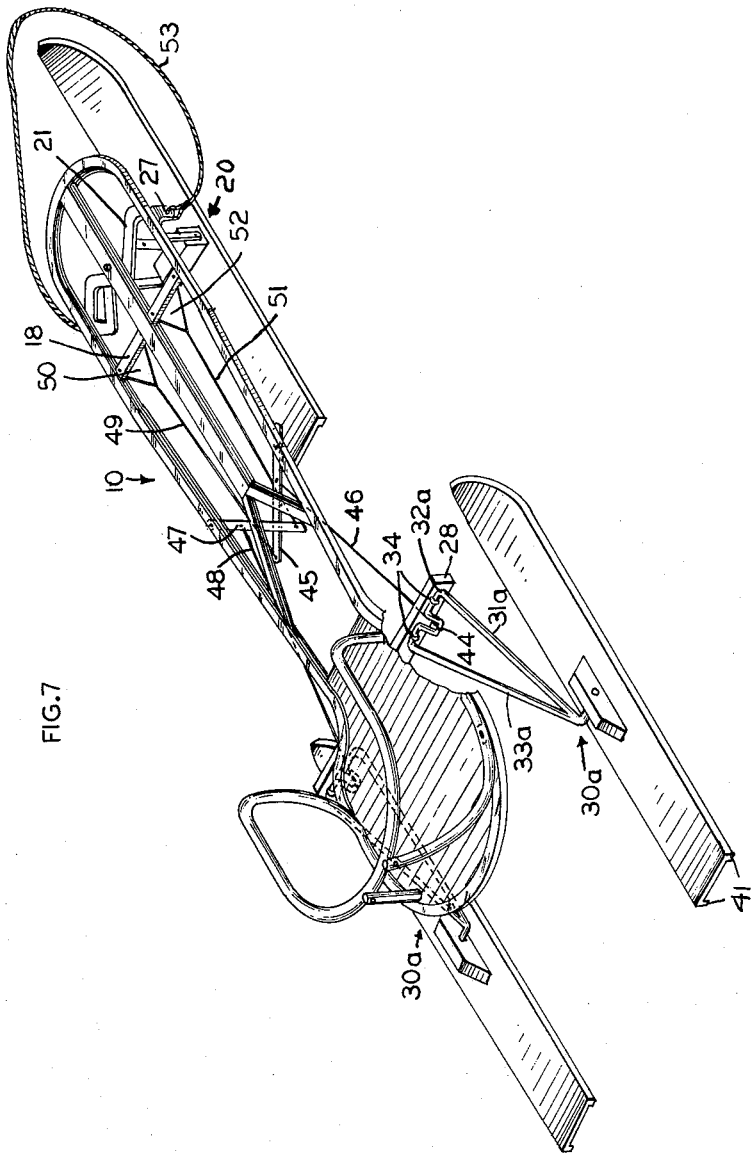

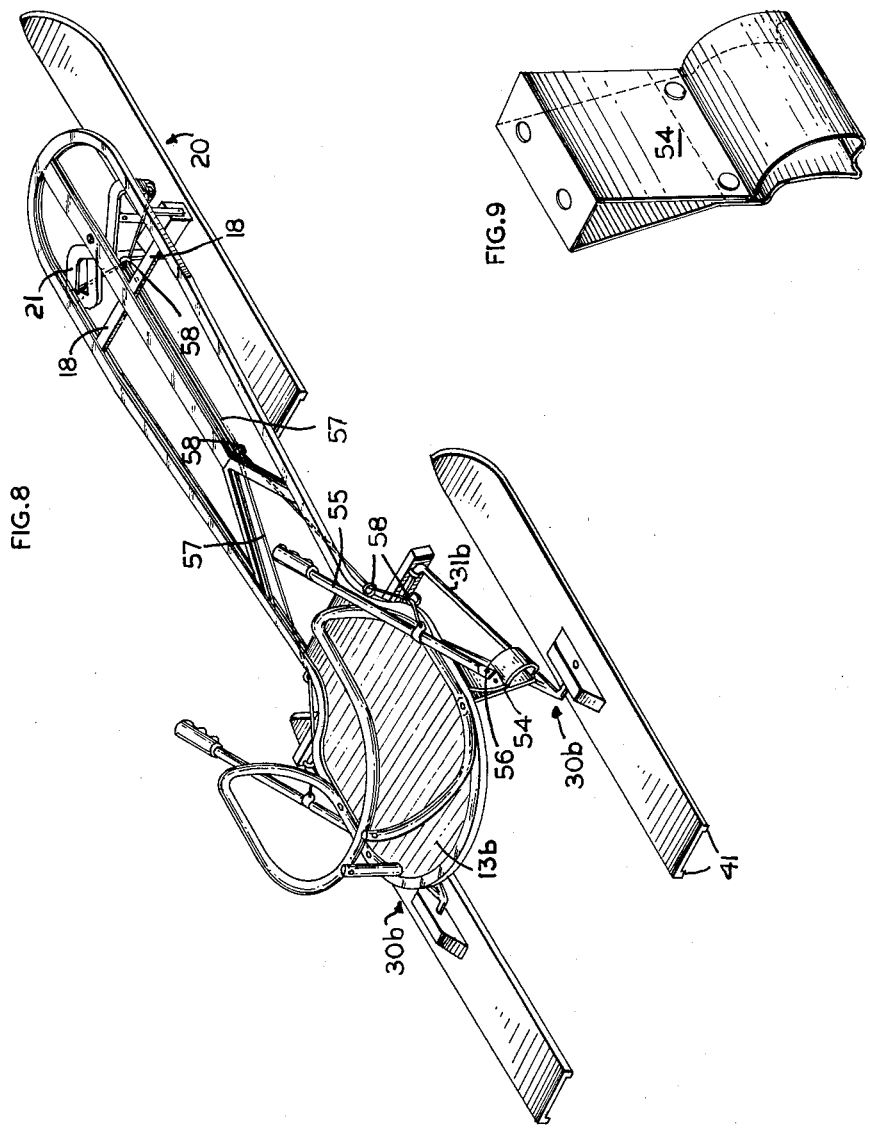

United States Patent Office 3,033,585
Patented May 8, 1962

3,033,585
VEHICLES
William H. Marston and Lawrence E. Dearborn, both of Glenhaven Circle, Saco, Maine
Filed Sept. 4, 1959, Ser. No. 838,084
6 Claims. (Cl. 280—16)

The present invention relates to coasting vehicles that are also adapted to be self-propelled.

While the invention is adapted to be incorporated in coasting vehicles, it is particularly suited and is herein discussed primarily with reference to such vehicles that are also capable of being self-propelled and particularly to such vehicles whose tread members are sled runners, skate runners, or ski elements, although the use of the term "tread members" is intended also to include wheels.

A general objective of the invention is to provide a vehicle having tread units that are adapted to be manually actuated to vary the vertical spacing of their tread members relative to the supporting structure thus to enable the supporting structure to be maintained in a level position under such conditions as when travelling lengthwise of a hillside or to be tilted to effect a banked turn.

Another general objective of the invention is to provide such a vehicle with tread units whose tread members are adapted to be manually actuated to effect their advance relative to the supporting structure, separately or together, and with or without attendant variations in their vertical relation to the supporting structure thus to effect forward movement of the vehicle.

Another general objective of the invention is to provide a vehicle in which its tread members are ski elements and the operator is enabled to approximate the movements of a skier without requiring his skills.

A still further objective of the invention is to provide a vehicle for meeting any of the above objectives in which the body and extremities of the operator are protected against many of the causes of injuries to which coasters and skiers are usually exposed.

In accordance with the invention, these objectives are attained by providing a vehicle having supporting structure and including a pair of tread units that are so connected thereto that they may be manually actuated to vary the vertical spacing between their tread members and the supporting structure and also to effect their longitudinal, vehicle advancing movement relative thereto, particularly with tread members whose connections include transverse pivots.

The supporting structure is also provided with a front part having a pair of parallel slideways for pedals. While these may be and are used in one embodiment of the invention, to actuate levers in control of the above mentioned tread units and the vehicle steered by hand controlled means, in other embodiments, such levers are hand operated and the pedals employed to turn a steering tread unit in one direction or the other and these are so located as to maintain the feet of the operator within the confines of the outer framework of the supporting structure. Hand operated levers may be used to operate the steering tread unit.

In the accompanying drawings, there are shown illustrative embodiments of the invention from which these and other of its objectives, novel features, and advantages will be readily apparent.

In the drawings:

FIG. 1 is a perspective view of a vehicle in accordance with the invention;

FIG. 2 is a rear end view thereof illustrating different operative positions;

FIG. 3 is a fragmentary, perspective view of the front part of the vehicle on an increased scale;

FIG. 4 is a like view of the rear part thereof;

FIG. 5 is a fragmentary, perspective view of a supporting leg and actuating lever, FIG. 6 is a fragmentary, perspective view of another ski member in accordance with the invention, FIG. 7 is a perspective view of a vehicle in accordance with another embodiment of the invention, FIG. 8 is a like view of yet another embodiment of the invention, and FIG. 9 is a perspective view, on an increased scale, of one of the stops used in the vehicle shown in FIG. 8.

In accordance with the embodiment of the invention illustrated by FIGS. 1-6, a vehicle has a generally indicated outer frame 10 formed of stock having an inwardly disposed channel 11. The frame 10 is shaped to form a rear part 12 marginally gripping the seat 13 and having a back 14 secured thereto, a parallel-sided front part 15, and an intermediate part 16 having its sides extending inwardly towards each other to establish the narrowest part of the frame adjacent the seat 13.

The front part 15 is reenforced and divided by a pair of oppositely disposed channels 17 interconnected in back-to-back relationship and extending rearwardly from the center of the front part, to which they are anchored, in parallel to the sides thereof, but diverging in the intermediate part 16 with each being attached to a respective one of the sides thereof. The channels 17 and the opposed channels of the front part 15 define a pair of slideways for pedals 18. The interconnected channels 17 support a depending pivot 19 for the forward tread unit, generally indicated at 20, and shown as comprising a transverse arm 21 having a depending fork 22 connected to a block 23 on a ski member 24 by a transverse pivot 25. Links 26, one for each pedal, are pivotally connected thereto and to respective ones of the ends of the arm 21 so that the ski member 24 may be turned to the right or to the left to steer the vehicle by pushing forwardly with the left or right foot, respectively, of the operator. The ends of the arm 21 bear against the undersurface of the sides of the front frame part 15 and are preferably arcuate with respect to the pivot 19 so that they do not protrude beyond the frame 10 as the vehicle is steered in one direction or the other. The ends of the cross arm 21 have downturned eyes 27 for use in attaching a tow rope, not shown, thereto. The tow rope may, of course, be used to steer the vehicle.

In the zone of the seat 13 there is a cross bar 28 secured to the undersurface of the frame 10, and, rearwardly thereof, the frame is provided with a transverse pivot 29. The two trailing tread units are generally indicated at 30 and each is shown as comprising a strut or leg 31 formed of rod stock whose end portions 32 and 33 are joined together to complete a triangle with the portion 32 being pivotally attached to the rear face of the cross bar 28 as by U-bolts 34 and with the portion 33 constituting a brace. Each leg 31 has an outwardly disposed, transverse stud 35 which pivotally supports the block 36 of a ski member 24.

At each side of the seat 13 there is a lever 37 having a handle 38 disposed above the front of the seat back 14. Each lever includes a channel 39 mounted at its upper end on the transverse frame pivot 29 and which is dimensioned to receive a section of the leg 31 within it and which is loosely retained in its lower end by the pin 40.

In the normal position of the trailing tread units 30, as when the vehicle is coasting, their ski members 24 are coplanar and the legs 31 are forwardly and upwardly inclined and seat within the channels 39 to swing the upper ends of the levers 37 forwardly and downwardly against the exposed ends of the cross bar 28 which serve as stops determining said normal position. If either lever 37 is swung rearwardly as by its handle 38, the lower end of its channel 39 thrusts against the associated leg 31 to swing it forwardly and downwardly. This movement is attended not only by an increase in the vertical spacing of the associated ski member relative to the vehicle frame 10, as is illustrated by the dotted line position of the right hand unit 30 in FIG. 2 but also a forward movement of that ski member as will be apparent from a comparison of the right and left hand ski members 24 in FIG. 4. The former movement, if the terrain, indicated by the broken line A—A of FIG. 2, is level, tilts the vehicle as when a banked turn is to be made. If the broken line A—B represents a hillside along which the vehicle is moving, the vertical movement of a tread member enables the vehicle then to be relatively more level. The latter movement is, of course, important by itself in effecting forward movement of the vehicle. In propelling the vehicle, the combined movements of each unit 30, alternately actuated, produce the best results, although the vehicle may be advanced by actuating both units 30 simultaneously, since as in skiing, when one trailing tread unit is actuated, it is advanced and the other trailing tread unit has relatively more weight on it thereby minimizing rearward sliding. It may also be noted that when either one of both trailing tread units are actuated, there is also a forward shifting of the center of gravity with the result that the leading tread unit, by which steering is effected, has more weight placed upon it. As the body is rigid, all the tread members tilt together relative to the surface, when one trailing unit is actuated. Effective control of steering is thus ensured.

The ski members 24 are shown as having downturned margins 41 and such ski members are preferred to ski members of conventional cross sectional shapes. The ski member 42, see FIG. 6, has a central rib 43 and it, too, is preferred to conventional ski constructions.

It will be appreciated that a vehicle in accordance with the invention also affords protection to the user as he is provided with a seat from which he cannot easily be dislodged, the location of the pedals 18 keeps his feet within the confines of frame 10, and the operating handles 38 are located where they are conveniently accessible so that it is natural for the user to maintain a firm grip thereon.

The vehicle shown in FIG. 7 is similar to that illustrated by FIGS. 1–6 and its trailing tread units are generally indicated at 30ª. The leg 31ª of each such unit has its end portions 32ª and 33ª joined together. The end portion 32ª is pivotably attached to the rear face of the cross bar 28 as by U-bolts 34. Between the attaching bolts 34, the end portion 32ª has a depending U-shaped bend 44.

An arm 45 is pivoted at one end to one side of the frame 10 and is connected to one U-shaped bend 44 as by a rod 46. An arm 47 is pivoted at one end to the opposite side of the frame 10 and is connected to the other U-shaped bend 44 by a rod 48. A rod 49 connected to the free end of the arm 45 includes a Y 50 attached to the left hand pedal 18 while a rod 51 is connected to the free end of the arm 47 and has a Y 52 attached to the right hand pedal 18.

In this embodiment of the invention, steering is effected by means of the tow rope 53 attached to the downturned eyes 27 at the ends of the cross arm 21 and the structure just described provides sufficient mechanical advantage to enable the trailing tread units 30ª to be easily operated by pushing forwardly on the appropriate pedal 18. It will be noted that each Y 50 and 52 serves as a heel support.

In the embodiment of the invention illustrated by FIGS. 8 and 9, which is a modification of the vehicle shown in FIG. 7, each of the trailing tread units 30ᵇ includes a stop 54 attached to the seat 13B which stop seats on the trailing leg or strut 31ᵇ and to which a lever 55 is pivoted as at 56. Each lever 55 is connected to an appropriate one of the pedals 18 as by a cable 57 passing through appropriately located supporting eyes 58. By this arrangement, the forward tread unit 20 may be steered by means of the hand operating levers 55.

While the vehicle has been herein discussed primarily as being equipped with ski members, its tread members may be other types of runners or wheels and in all embodiments, simplicity of construction, safety of operation, and unique functions are combined to make the use of vehicles in accordance with the invention attractive to a wide range of people and for a wide range of uses.

We claim:

1. In a vehicle of the character described, body structure including a pair of slideways in the front part thereof and pedals, one for each slideway and slidable therein, a leading tread unit including a vertical pivotal connection with the front end of said structure, a pair of laterally spaced trailing tread units, each trailing unit including a leg whose upper end is transversely pivoted to the rear portion of said structure, and a connection between each pedal and an appropriate one of said legs, each of said connections including an arm pivoted to said body structure and a pair of members connected to each of said arms, one of said members being connected to a leg and the other of said members being connected to a pedal.

2. In a vehicle of the character described, a rigid body, a leading tread unit including a part pivotally connected to the front portion of said body to turn relative thereto about a vertical pivot axis and a ski-like member transversely pivoted to said part, steering means connected to said unit, a pair of laterally spaced trailing tread units, each trailing tread unit including a single leg portion pivotally connected to the rear portion of said body to swing relative thereto about a transverse axis and provided with actuating means operable by the user, and a ski-like member transversely pivoted to said leg portion, and stop means carried by said body for engagement by each leg portion when the pivot axis of its associated ski-like member is in a position rearwardly of the pivot axis of said leg portion to establish the minimum height of said body with respect to that ski-like member, said actuating means being operable to swing the leg portion of either unit to advance its ski-like member, such advance raising said body relative to the ski-like member of that unit with a forward shifting of the center of gravity of the vehicle and the transverse tilting of all ski-like members relative to the surface over which the vehicle is moving.

3. In a vehicle of the character described, a rigid body, a leading tread unit including a part pivotally connected to the front portion of said body to turn relative thereto about a vertical pivot axis and a ski-like member transversely pivoted to said part, steering means connected to said unit, a pair of laterally spaced trailing tread units, each trailing tread unit including a single leg portion pivotally connected to the rear portion of said body to swing relative thereto about a transverse axis, said leg portion including a hand lever portion extending upwardly for engagement by the user, and a ski-like member transversely pivoted to said leg portion, and stop means carried by said body for engagement by each leg portion when the pivot axis of its associated ski-like member is in a position rearwardly of the pivot axis of said leg portion to establish the minimum height of said body with respect to that ski-like member, and said lever portion is in a forward position, rearward swinging of the lever portion of either trailing tread unit raising said body relative to the ski-like member of that unit with a forward shifting of the center of gravity of the vehicle and the transverse tilting of all ski-like members relative to the surface over which the vehicle is moving.

4. In a vehicle of the character described, a rigid body, a leading tread unit including a part pivotally connected to the front portion of said body to turn relative thereto about a vertical pivot axis and a ski-like member transversely pivoted to said part, steering means connected to said unit, a pair of laterally spaced trailing tread units, each trailing tread unit including a single leg portion pivotally connected to the rear portion of said body to swing relative thereto about a transverse axis and provided with actuating means operable by the user, and a ski-like member transversely pivoted to said leg portion, and stop means carried by said body for engagement by each leg portion to establish a pair of limits to the extent to which said leg portion may swing, the pivot axis of each leg portion being approximately vertically above the pivot axis of the associated ski-like member at one of said limits to establish the maximum height of said body with respect to that ski-like member, the pivot axis of each ski-like member being rearwardly of the pivot axis of its leg portion to establish the minimum height of said body with respect to that ski-like member at the other of said limits, said actuating means being operable to swing the leg portion of either unit from the last named limit to the first named limit to advance its ski-like member, such advance raising said body relative to the ski-like member of that unit with a forward shifting of the center of gravity of the vehicle and the transverse tilting of all ski-like members relative to the surface over which the vehicle is moving.

5. In a vehicle of the character described, a rigid body, a leading tread unit including a part pivotally connected to the front portion of said body to turn relative thereto about a vertical pivot axis and tread means attached to said part, steering means connected to said unit, a pair of laterally spaced trailing tread units, each trailing tread unit including a single leg portion pivotally connected to the rear portion of said body to swing relative thereto about a transverse axis and provided with actuating means operable by the user, and a runner member transversely pivoted to said leg portion, and stop means carried by said body for engagement by each leg portion when the pivot axis of its associated runner member is in a position rearwardly of the pivot axis of said leg portion to establish the minimum height of said body with respect to that runner member, said actuating means being operable to swing the leg portion of either unit to advance its runner member, such advance raising said body relative to the runner member of that unit with a forward shifting of the center of gravity of the vehicle and the transverse tilting of said runner members relative to the surface over which the vehicle is moving.

6. In a vehicle of the character described, a rigid body, a leading tread unit including a part pivotally connected to the front portion of said body to turn relative thereto about a vertical pivot axis and tread means attached to said part, steering means connected to said unit, a pair of laterally spaced trailing tread units, each trailing tread unit including a single leg portion pivotally connected to the rear portion of said body to swing relative thereto about a transverse axis and provided with actuating means operable by the user, and a runner member transversely pivoted to said leg portion, and stop means carried by said body for engagement by each leg portion, when the pivot axis of its associated runner member is in a position rearwardly of the pivot axis of said leg portion to establish the minimum height of said body with respect to that runner member, said actuating means being operable to swing the leg portion of either unit to advance its runner member, such advance raising said body relative to the runner member of that unit with a forward shifting of the center of gravity of the vehicle and the transverse tilting of said runner members and said tread means relative to the surface over which the vehicle is moving.

References Cited in the file of this patent

UNITED STATES PATENTS

| | | |
|---|---|---|
| 225,760 | Overstreet | Mar. 23, 1880 |
| 367,280 | Emerson | July 26, 1887 |
| 368,802 | Allen | Aug 23, 1887 |
| 381,665 | Allen | Apr. 24, 1888 |
| 791,683 | Fee | June 6, 1905 |
| 993,622 | Rogers | May 30, 1911 |
| 1,343,993 | Barrett | June 22, 1920 |
| 1,394,629 | Leicht | Oct. 25, 1921 |
| 1,592,419 | Campbell | July 13, 1926 |
| 2,094,804 | McNamara | Oct. 5, 1937 |

FOREIGN PATENTS

| | | |
|---|---|---|
| 225,550 | Germany | Sept. 14, 1910 |
| 923,474 | Germany | Feb. 14, 1955 |
| 453,644 | Italy | Dec. 9, 1949 |
| 42,129 | Switzerland | Mar. 23, 1908 |